(12) United States Patent
Gallegos-Lopez et al.

(10) Patent No.: US 7,605,497 B2
(45) Date of Patent: Oct. 20, 2009

(54) TWO-SOURCE INVERTER

(75) Inventors: Gabriel Gallegos-Lopez, Torrance, CA (US); James M. Nagashima, Cerritos, CA (US); Silva Hiti, Redondo Beach, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 196 days.

(21) Appl. No.: 11/760,101

(22) Filed: Jun. 8, 2007

(65) Prior Publication Data

US 2008/0303349 A1     Dec. 11, 2008

(51) Int. Cl.
*H02J 3/00*     (2006.01)
*H02J 1/10*     (2006.01)

(52) U.S. Cl. .............................. 307/58; 307/45; 307/52

(58) Field of Classification Search ............. 307/45–46, 307/52, 58, 82
See application file for complete search history.

(56) References Cited

U.S. PATENT DOCUMENTS

2008/0024078 A1 *    1/2008    Oyobe et al. ................. 318/262

* cited by examiner

*Primary Examiner*—Stephen W Jackson
*Assistant Examiner*—Carlos Amaya

(57) ABSTRACT

Systems and methods are disclosed for a two-source inverter. The systems and methods combines operation of a first voltage source powering a conventional single source inverter with second voltage source powering a novel switch configuration to power a load. The switch configuration is controlled by a plurality of control signals generated by controller based on a variety of control modes, and feedback signals.

11 Claims, 3 Drawing Sheets

TWO-SOURCE INVERTER

TECHNICAL FIELD

Embodiments of the present invention relate generally to electric power converters, and more particularly relate to DC-AC inverters.

BACKGROUND

An inverter is an electronic circuit for converting direct current (DC) to alternating current (AC). Inverters are used in a wide range of applications, from small uninterruptible power supplies for a computer to large electric power transport utility applications. A common application is for DC voltage source utilization such as a system designed to provide 115 volts AC from the 12 volts DC source provided in an automobile—the 12 volts DC source is first boosted over 200 V DC by a DC/DC converter, and then the inverter converts the high DC voltage to 115 volts AC. An inverter supplies AC power to operate equipment that is normally supplied from a power line or to power an AC electric motor. Inverters are also used to provide a source of AC power from fuel cell or photovoltaic solar cell power supplies. Uninterruptible power supplies are another type of application. Uninterruptible power supplies may use batteries to store power and an inverter to supply AC power from the batteries when power lines are not functioning or unavailable. When the power lines are restored, the batteries are recharged. High-voltage direct current power transmission is another application, where AC power is rectified into a high voltage DC and transmitted to another location. At the receiving location, an inverter converts the DC back to AC.

The term inverter has its origin from electro-mechanical inverters. Historically, DC-to-AC power conversion was accomplished using electro-mechanical rotary converters coupling an AC electric motor to an DC electric generator in order to convert an AC input into a DC output. If the connections to a converter are inverted, the input is DC and the output is AC, so is an inverter.

These early electro-mechanical devices were replaced with vacuum and gas filled tube switches in inverter circuits. Because they have higher voltage and current ratings, controlled switches that can be turned on and turned off by means of control signals have become the preferred switching components for use in inverter circuits.

Three-phase is a common type of AC that can be produced by an inverter and used for electric power applications. It is a type of multi-phase system used to power motors, transformers, and many other devices. Three-phase has properties that make it very desirable in electric power systems: the phase currents sum to zero in a properly balanced load making it possible to eliminate the AC neutral conductor; power transfer into a balanced load is constant reducing generator and motor vibrations; and three-phase systems can produce a magnetic field that rotates in a specified direction, which simplifies the design of electric motors. Three is the lowest phase order with these properties.

An important type of three-phase load is an electric motor. A three-phase electric motor has a simple design, high torque at low RPM, and high efficiency. Three-phase motors are used for pumps, fans, blowers, compressors, electric and diesel-electric locomotives and many other kinds of motor-driven equipment. Three-phase motors are more compact, less expensive, vibrate less, last longer than a single-phase motor of the same power rating, and are subsequently preferred over single-phase for motors above 10 HP (7.5 kW). Hybrid, fuel cell, and electric vehicles often use three-phase motors because their high starting torque can be used to accelerate a vehicle to a useful speed. A three-phase motor can also be used as a generator for regenerative braking. Improvements in three-phase inverter technology are being developed specifically for electric vehicle applications, such as adjustable speed motor control three-phase inverters that are currently used in some hybrid electric highway vehicles Hybrid, fuel cell, and electric vehicles often have more than one source of DC power. For example, these vehicles may use electric batteries, ultra-capacitors, fuel cells, and fuel powered generators, all producing DC power. Moreover, the different sources will often have different voltages requiring voltage conversion to combine their electrical voltages. A traditional approach is to use a DC/DC converter, which is a complex and expensive piece of equipment.

Accordingly, it is desirable to have a simple system for using two sources for an inverter without using a DC/DC converter. Furthermore, other desirable features and characteristics will become apparent from the subsequent detailed description and the appended claims, taken in conjunction with the accompanying drawings and the foregoing technical field and background.

BRIEF SUMMARY

Systems and methods are disclosed for a two-source inverter. The systems and methods combine operation of a first voltage source powering a conventional single source inverter with a second voltage source powering a switching configuration to power a load. The switching configuration is controlled by a plurality of control signals generated by a controller based on a variety of control modes.

The system has a first voltage source coupled to a first switch set having DC inputs, AC outputs, and control inputs, wherein the DC inputs are coupled to the first voltage source. The system also has a second voltage source coupled to a second switch set having DC inputs, AC outputs, and control inputs, wherein the DC inputs are coupled to the second voltage source. A load may be coupled to the first switch set AC outputs and the second switch set AC outputs. A controller is coupled to the first and second switch set control inputs, and the controller is configured to control the first and second switch set control inputs.

An operating method as described herein begins by determining a control mode for a controller having a plurality of control signals, and feedback signals. The method then operates a first set of switches to control a first electrical current from a first electrical voltage source based on the plurality of control signals, and feedback signals. Furthermore, the method then operates a second set of switches controlling a second electrical current from a second electrical voltage source based on the plurality of control signals and feedback signals. The first and second electrical currents may then power a load.

BRIEF DESCRIPTION OF THE DRAWINGS

Embodiments of present invention will hereinafter be described in conjunction with the following drawing figures, wherein like numerals denote like elements.

DETAILED DESCRIPTION

Figure 1:
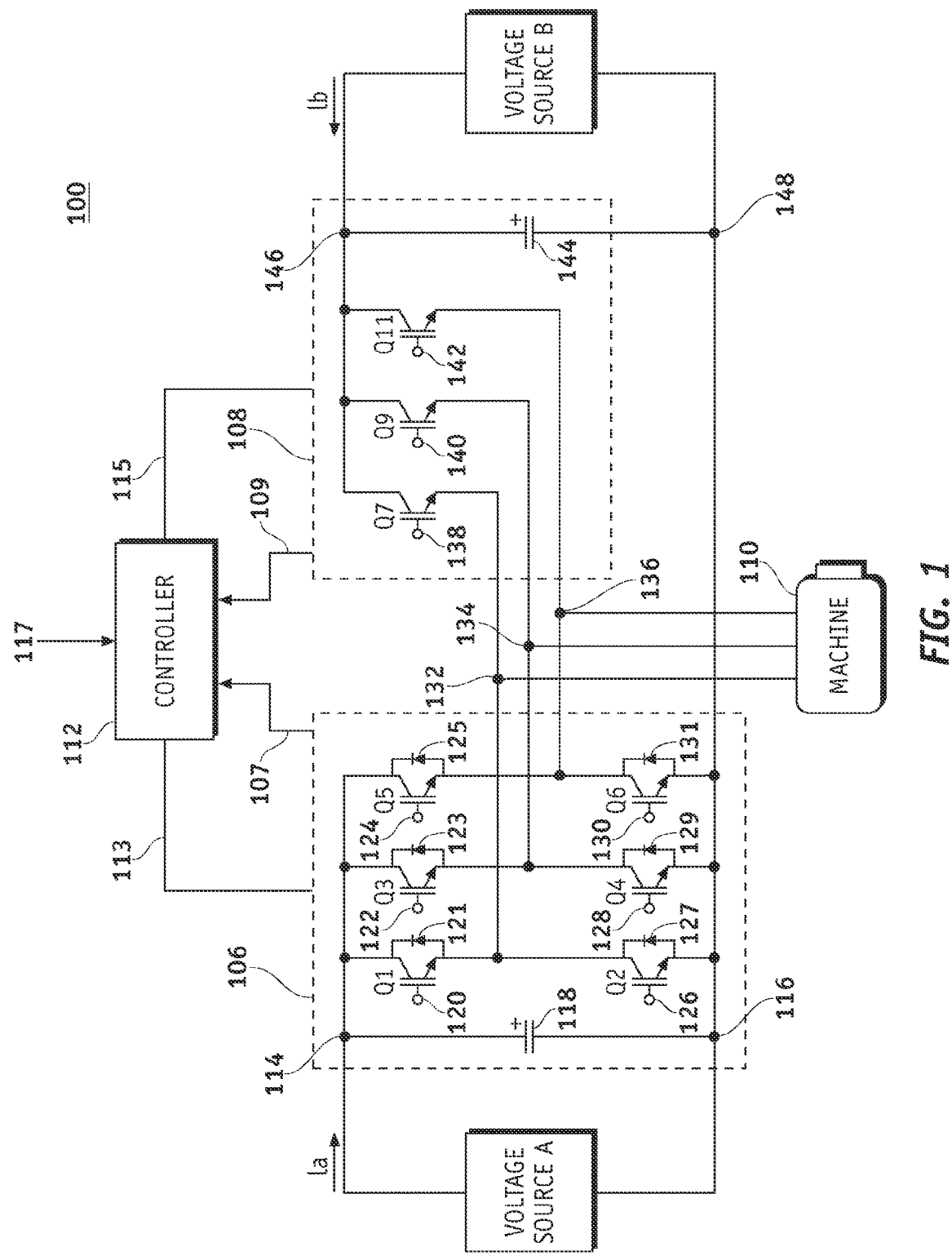
FIG. 1 is a schematic representation of an embodiment of a two-source three-phase inverter system.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, controlled switches, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of vehicle applications and that the system described herein is merely one example embodiment of the invention.

For the sake of brevity, conventional techniques and components related to vehicle electrical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown in FIGS. 1-2 depict example arrangements of elements, additional intervening elements, devices, features, or components may be present in an embodiment of the invention (assuming that the functionality of the system is not adversely affected).

Embodiments of the invention are described herein in the context of one practical non-limiting application, namely, a two-source three-phase inverter system for a vehicle. In this context, the example technique is applicable to operation of a system suitable for a vehicle. Embodiments of the invention, however, are not limited to such vehicle applications, and the techniques described herein may also be utilized in other power conversion systems.

Three-phase inverters are used for variable-frequency drive applications. There are many different power circuit topologies and control strategies used in inverter designs. Different design approaches are used to address various issues that may be more or less important depending on the way that the inverter is intended to be used.

Figure 2:
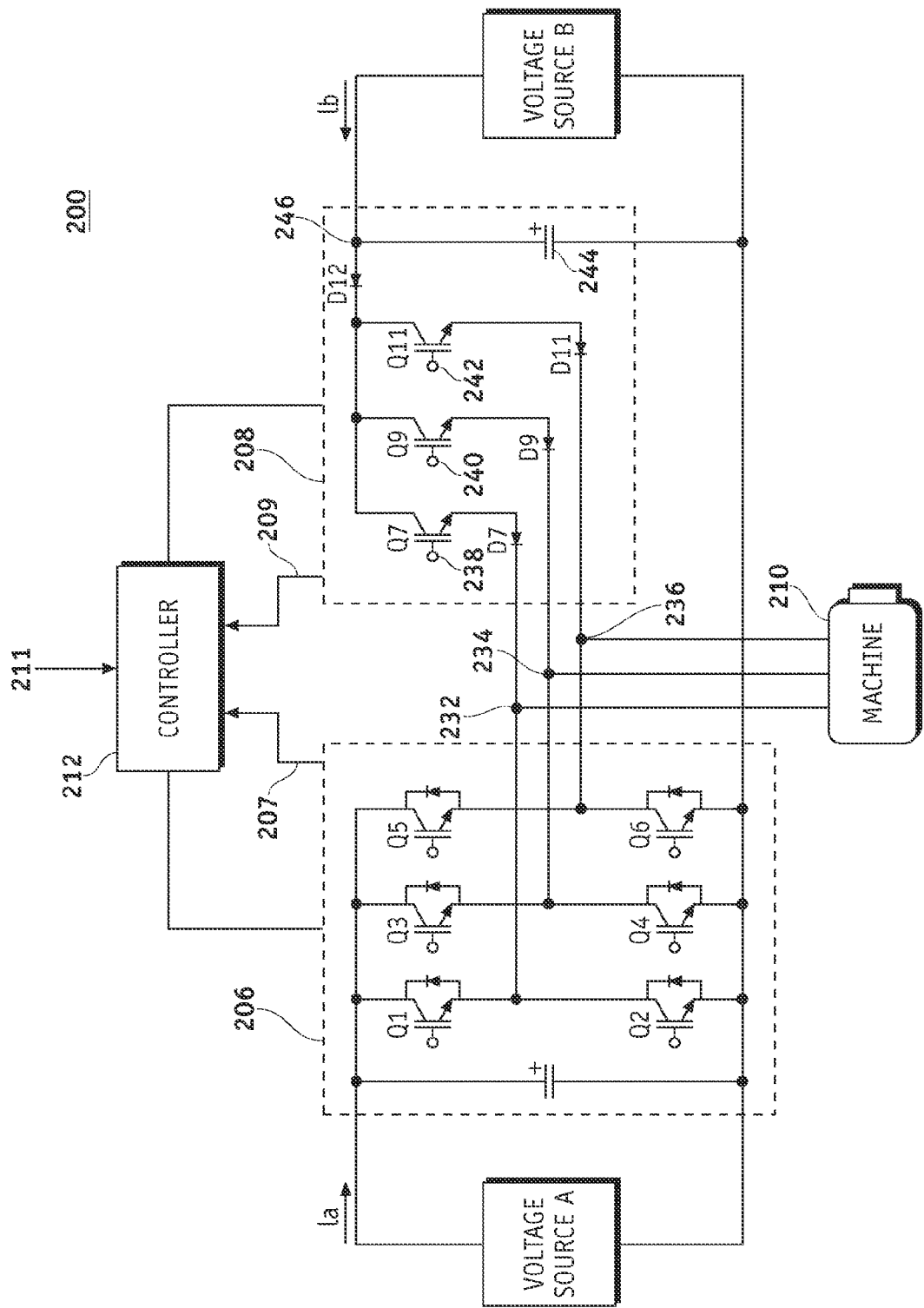
FIG. 2 is a schematic representation of another embodiment of a two-source three-phase inverter system.

FIG. 1 is a schematic representation of a two-source three-phase inverter system 100 for a hybrid vehicle that is suitably configured to perform the operations described in detail herein. System 100 is suitable for use with a vehicle having an electric (or hybrid) traction motor. A practical two-source three-phase inverter system 100 may include a number of electrical components, circuits and controller units other than those shown in FIG. 1. Conventional subsystems, features, and aspects of the two-source three-phase inverter system 100 will not be described in detail herein. For this example embodiment, as shown in FIG. 1, the system 100 may generally include: a voltage source A, a voltage source B, an inverter circuit 106, a switch set 108, an electric machine 110 or other load, and a controller 112.

The voltage source A is configured to support a hybrid vehicle operation. The voltage source A has a first pole connected to node 114 and a second pole connected to node 116. The voltage source A may be connected in this manner to the inverter circuit 106, which in turn provides power to the electric machine 110. The voltage source A is configured to provide an electrical voltage and current to the inverter circuit 106 via a first DC input at node 114, and a second DC input at node 116. The electrical voltage provided by the voltage source A is a high DC voltage, which may be in the neighborhood of 300 volts for this application. The voltage source A may be, for example, a generator, fuel cell, batteries (such as lead acid, nickel metal hydride, or lithium ion batteries), or ultra-capacitors.

The voltage source B is also configured to support a hybrid vehicle operation. The voltage source B may be connected to the switch set 108 that provides the second source of power to the electric machine 110. The voltage source B has a first pole connected to node 146 and a second pole connected to node 148. For the illustrated embodiment, node 148 corresponds to node 116. The voltage source B is configured to provide an electrical voltage and current to the switch set 108 via a first DC input at node 146, and a second DC input at node 148. The electrical voltage provided by the voltage source B is a high DC voltage, which may be in the neighborhood of 300 volts for this application. The voltage source B may be realized as a generator, fuel cell, batteries, or ultra-capacitors as mentioned above for the voltage source A. As will be discussed in detail below, for the system 100 to function properly, the voltage source B needs to have a voltage with a value lower than or equal to voltage source A because the feedback diodes in the inverter circuit 106 would otherwise form a circuit to voltage source A discharging voltage source B. The illustrated embodiments employ IGBT controlled switches, however, other controlled switches types may be utilized.

The inverter circuit 106 by itself is a common architecture for a single voltage source inverter. For this example, the inverter circuit 106 includes switches Q1-Q6, feedback diodes (reference numbers 121, 123, 125, 127, 129, and 131), gate contacts (reference numbers 120, 122, 124, 126, 128, and 130) and a capacitor 118. The inverter circuit 106 has a first input connected to node 114 and a second input connected to node 116/148. They are labeled inputs, because in most operating conditions current will flow into the inputs, however under some operating conditions, such as regenerative braking, current may flow in a negative direction (recharge current). The first input of inverter circuit 106 is also coupled to the voltage source A via node 114. The inverter circuit 106 also has a set of first AC outputs connected as follows: a first output connected to node 132, a second output connected to node 134, and a third output connected to node 136. The switches Q1-Q6 are connected as follows: Q1 is between node 114 and node 132, Q3 is between node 114 and node 134, Q5 is between node 114 and node 136, Q2 is between node 116 and node 132, Q4 is between node 116 and node 134, Q6 is between node 116 and node 136. In this embodiment the collector of switch Q1 corresponds to node 114, the emitter of switch Q1 corresponds to node 132, the collector of switch Q2 corresponds to node 132, the emitter of switch Q2 corresponds to node 116, the collector of switch Q3 corresponds to node 114, the emitter of switch Q3 corresponds to node 134, the collector of switch Q4 corresponds to node 134, the emitter of switch Q4 corresponds to node 116, the collector of switch Q5 corresponds to node 114, the emitter of switch Q5 corresponds to node 136, the collector of switch Q6 corresponds to node 136, and the emitter of switch Q6 corresponds to node 116.

The current capacity of the controlled switches depends on the power rating of the electric machine 110 and it may vary for each controlled switch. In this example embodiment, the current capacity is the same for all controlled switches Q1-Q6. Since most loads contain inductance, the feedback diodes are often connected across each controlled switch to provide a path for the inductive load current when the controlled switch is turned off. In this regard, each of the controlled switches Q1-Q6 contains a respective feedback diode to allow a negative current from the load to charge the voltage source. In practice, electric machine 110 can recharge the voltage source A (assuming voltage source A is a rechargeable device) during regenerative braking of a vehicle. During regenerative braking from the electric machine 110, the inputs may have negative current flow (recharge current). This embodiment handles such current flow using the gate contacts 120, 122, 124, 126, 128, and 130. In this regard, the gate contacts are coupled to and controlled by the controller 112. The gate contacts are configured to allow current flow or block current flow in response to the voltage of the control signals from the controller 112.

Capacitor 118 is included in inverter circuit 106 to provide power conditioning and to smooth voltage surges of the inverter. The capacitor 118 has a first pole connected to node 114 and a second pole connected to node 116/148. The capacitor 118 is included to buffer electrical energy between the voltage source and the output nodes 132/134/136. In practice, capacitor 118 may be realized as an ultra-capacitor or as any suitable capacitance element. Capacitor 118 may also represent the capacitance that will naturally exist in other components of the hybrid vehicle such as, for example without limitation, an active electrical bus, and/or power electronics. Each of these devices may contain capacitors, power output stages, etc. The capacitance of capacitor 118 may vary from one application to another, depending on the power required by the electric machine 110. In this example embodiment, capacitor 118 has a capacitance of about 1,000 microfarads.

The switch set 108 includes controlled switches Q7/Q9/Q11, gate contacts 138/140/142 and a capacitor 144. The switch set 108 has a first input connected to node 146 and a second input connected to node 148. The second input is coupled to voltage source B. As mentioned above, node 148 is coupled to node 116 of inverter circuit 106 (in this embodiment, node 148 corresponds to node 116). They are labeled inputs, because in most operating conditions current will flow into the inputs, however under some operating conditions, such as regenerative braking, current may flow in a negative direction (recharge current). The switch set 108 also has a set of AC outputs connected as follows: a first output connected to node 132, a second output connected to node 134, and a third output connected to node 136. The controlled switches Q7/Q9/Q11 are connected as follows: Q7 is between node 146 and node 132, Q9 is between node 146 and node 134, Q11 is between node 146 and node 136. In this embodiment the collector of switch Q7 corresponds to node 146, the emitter of switch Q7 corresponds to node 132, the collector of switch Q9 corresponds to node 146, the emitter of switch Q9 corresponds to node 134, the collector of switch Q11 corresponds to node 146, and the emitter of switch Q11 corresponds to node 136. As mentioned above in the context of inverter circuit 106, the current capacity of the controlled switches depends on power rating of the electric machine 110 and may vary for each controlled switch. In this example embodiment, the current capacity is the same for all controlled switches Q7/Q9/Q1.

Capacitor 144 is included in switch set 108 for the same reasons capacitor 118 is included in inverter circuit 106. Generally, the above description of capacitor 118 also applies to capacitor 144. The capacitor 144 has a first pole connected to node 146 and a second pole connected to node 148. Note that the capacitor 144 is coupled in parallel with the voltage source B.

Gate contacts 138/140/142 are coupled to and controlled by the controller 112. The gate contacts are configured to allow current flow or block current flow in response to the voltage of the control signals from the controller 112. The controlled switches Q7, Q9, and Q11 control the current flow from the voltage source. In this regard, a need for a DC-DC converter is eliminated. The controlled switches Q7, Q9, and Q11 are switched on and off by control signals from the controller 112 in order to convert the DC voltage from the voltage source B into an AC current suitable for use by the electric machine 110. The controlled switches Q2, Q4, and Q6 from switch set 106 are operated in common with switch set 108. The controlled switches Q7, Q9, and Q11 in conjunction with inverter circuit 106 control and provide power to the electric machine 110.

The switch set 108 and inverter circuit 106 arrangement is actuated by a suitably configured controller 112, which can be coupled to the switch arrangement 106/108 via control inputs 113/115. The controller 112 may be implemented as part of a vehicle computing module, a centralized vehicle processor, a subsystem computing module devoted to the switch arrangement, or the like. In operation, the controller 112 receives command signals 117 and feedback signals 107/109 and controls the actuation of the controlled switches in accordance with the current state of the vehicle, or required power flow, e.g., whether the regenerative braking mode or the normal operating mode is active. The controlled switches Q1-Q11 are activated by the controller 112 based on the predetermined pattern of control signals. In this regard, a controlling pattern for the control signals is calculated for activating the controlled switches Q1-Q11. Each switch may be activated via its respective control inputs depending on a predetermined duty cycle as explained below in the context of FIG. 3. The controller 112 is generally a software-controlled device. Under normal conditions, it operates the controlled switches Q1-Q11 to produce a three-phase AC current during vehicle operation.

The electric machine 110 is coupled to the AC output nodes 132/134/136 connected to controlled switches Q1-Q11. The electric machine 110 for this example includes an AC electric machine to provide power or additional power to a power train, and for regenerative braking. AC electric machines are often used for this application because they provide high torque under load, and high power. The electric machine 110 is a three-phase AC electric machine, and may be, without limitation, an induction or synchronous three-phase AC electric machine.

FIG. 2 is a schematic representation of another embodiment of a two-source three-phase inverter system 200, which is suitable for a hybrid vehicle. System 200 is suitable for use with a vehicle having an electric traction motor. A practical two-source three-phase inverter system 200 may include a number of electric components, circuits and controller units other than those shown in FIG. 2. Conventional subsystems, features, and aspects of the two-source three-phase inverter system 200 will not be described in detail herein. System 200 has a structure that is similar to system 100, and common features, functions, and elements will not be redundantly described here. For this example embodiment, as shown in FIG. 2, the system 200 may generally include: a voltage source A, a voltage source B, an inverter circuit 206, a switch set 208, an electric machine 210 or other load, a controller 212, and diodes D7/D9/D11/D12. The aforementioned components function in the same manner as those in system 100 with the exception of additional diodes in switch set 208.

The switch set 208 includes controlled switches Q7/Q9/Q11, gate contactors 238/240/242, a capacitor 244, and diodes D7/D9/D11/D12. Diode D7 is connected between controlled switch Q7 and node 232, diode D9 is connected between controlled switch Q9 and node 234, diode D11 is connected between controlled switch Q11 and node 236 and diode D12 is connected between node 246 and controlled switches Q7/Q9/Q11. As compared to system 100, in this embodiment, diodes D7/D9/D11/D12 are added for voltage blocking protection of controlled switches Q7/Q9/Q11. In this regard, diodes D7/D9/D11/D12 allow current flow in only one direction—from the voltage source B or capacitor 244 to electric machine 210. These additional diodes represent optional components that can be utilized for voltage blocking protection for controlled switches Q7, Q9, and Q11.

Figure 3:
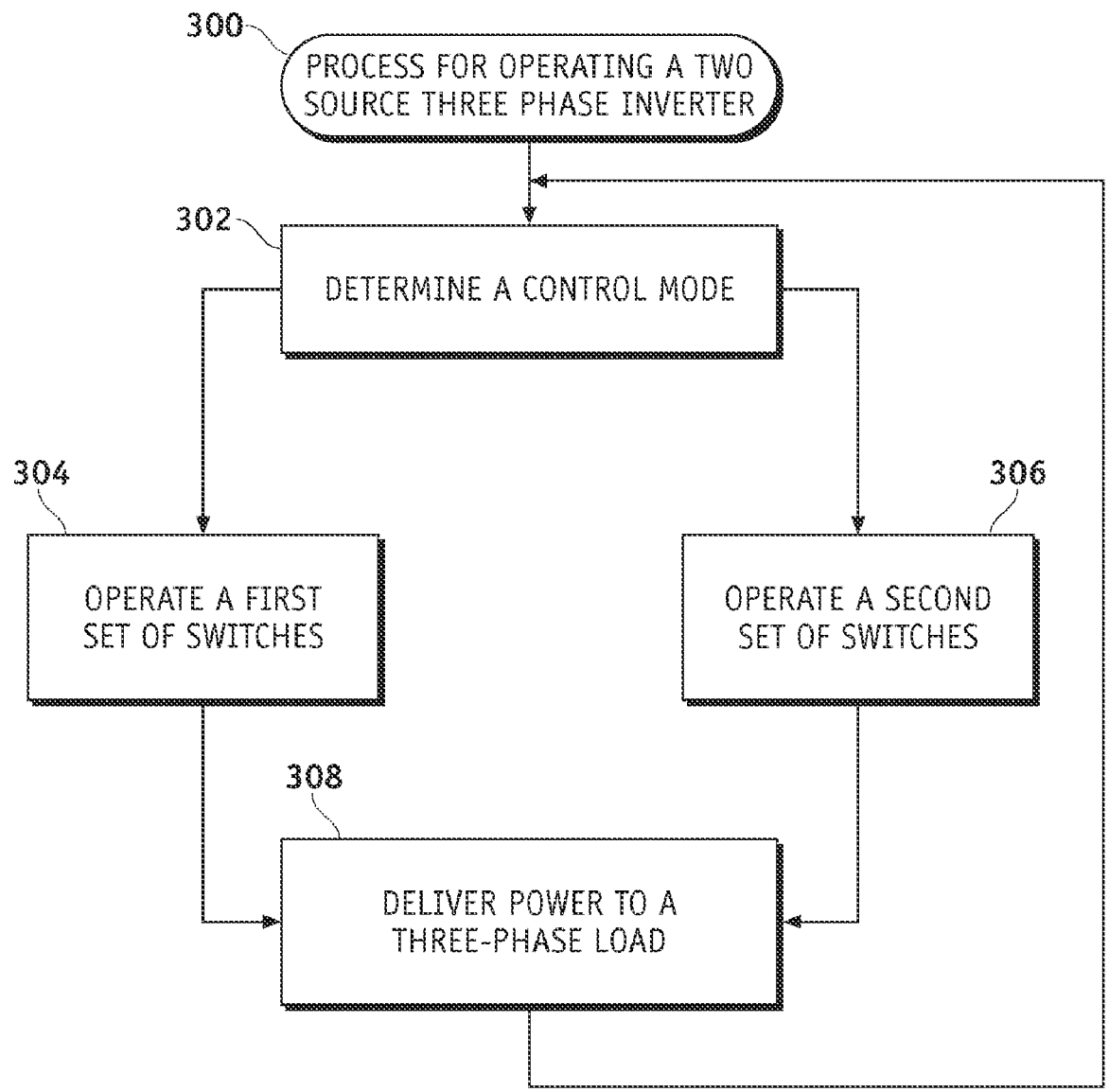
FIG. 3 is a flowchart illustrating an embodiment of a two-source three-phase inverter system operating process.

FIG. 3 is a flowchart illustrating a two-source inverter operation process 300 for an electric, hybrid electric, or fuel cell vehicle that may be performed by systems 100-200 as described above. Process 300 determines a control mode, operates a first set of switches, operates a second set of switches, and connects power to a multi-phase load. The various tasks performed in connection with process 300 may be performed by software, hardware, firmware, or any combination thereof. For illustrative purposes, the following description of process 300 may refer to elements mentioned above in connection with FIGS. 1-2. In practical embodiments, portions of process 300 may be performed by different elements of two-source inverter systems 100-200, e.g., the voltage source A, the voltage source B, the inverter circuit 106, the switch set 108, and the controller 112.

Two-source (three-phase) inverter operation process 300 begins by determining a control mode (inquiry task 302). The determination may be made by consideration of various status conditions, and desired system conditions, for example the RPM of the vehicle wheels, the power output of a gasoline engine, the RPM of the gasoline engine, an amount of charge in voltage source A, an amount of charge in the voltage source B, and various relations between these parameters. For example, if a vehicle is braking, then the electric machine should send power to the voltage sources if they are rechargeable, and determine a regeneration mode. In this regard, the control mode may allow positive current only from voltage source A, or voltage source B, or both, negative current flow only recharging voltage source A.

Next, process 300 operates the first set of switches Q1-Q6 (task 304). For this embodiment, the first set of switches are individually turned on and off by a Pulse Width Modulation (PWM) control signal. PWM provides control signals to operate the controlled switches to produce desired average output voltage. For example, if a 300 volt battery is connected to a device and the duty cycle is about 50% alternated between about 300 volts and about zero volts, the effective output voltage is about 50% of that of a constant 300 volts or 150 volts. Similarly, a duty cycle of X % may give an output voltage of X % of the voltage range and, accordingly, power available may be less than the total power. Various control modes may use the PWM signal to control the behavior of the two-source inverter system 100 or system 200.

Power coming from each source is regulated by controlling the PWM control signals sent to the switches Q1, Q3, Q5, Q7, Q9 and Q11. The time that a set of switches (either Q1, Q3, Q5 or Q7, Q9, Q11) is allowed to switch is determined based on how much power is required from the voltage sources A and/or B. This time is controlled by a controller as explained above in the context of FIG. 1. For example, with a duty cycle of 30%, switches Q1/Q3/Q5 are allowed to switch 30% of the time compared to switch set Q7, Q9 and Q11.

Concurrently with the operation of the first set of switches, process 300 operates the second set of switches Q7-Q11 (task 306). Using the first set of switches in conjunction with the second set of switches and proper control, the current flow to the electric machine can be more precisely controlled. The first and second set of switches may be operated together or independently to provide power individually or in combination to the electric machine. The frequency represented by the number of narrow pulses per second is called the switching frequency or carrier frequency. Combining the current from the first and second switch sets allows for an even larger number of options since the voltage source A may have a different voltage from voltage source B, and the combination of switching patterns using, for example, switch Q1 in conjunction with switch Q7 will produce different levels of current flow from both voltage sources.

Process 300 then delivers power to a multi-phase (three-phase) load (task 308). For this embodiment, the multi-phase load is a three-phase electric machine. Depending on the vehicle operation mode, the electric machine may be operating as a load receiving power from the voltage source A through the first switch set and the voltage source B through the second switch set, or operating as a generator returning power to the first voltage source A through the first switch set. The performance of the electric machine depends on the level of current flow from the switching of the first and second switch sets as described above. Another mode of operation is that power can flow from voltage source B to voltage source A and to electric machine load 110 simultaneously. Process 300 then leads back to task 302.

With this approach, the proposed topology has the flexibility to provide power from two different sources and that power flow can be controlled to charge one of the sources without comprising the power delivered to the machine.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:
1. A two-source inverter system, the system comprising:
a first voltage source;
a second voltage source;
a first switch set having first DC inputs, first AC outputs, and first control inputs, wherein the first DC inputs are coupled to the first voltage source, and wherein the first AC outputs are configured to be coupled to an AC multi-phase load;

a second switch set having second DC inputs, second AC outputs, and second control inputs, wherein the second DC inputs are coupled to the second voltage source, and wherein the second AC outputs are configured to be coupled to the AC multi-phase load; and a controller coupled to the first control inputs and the second control inputs, the controller being configured to receive first feedback signals and second feedback signals from the first switch set and the second switch set respectively, and the controller being configured to control current flow through the first switch set and the second switch set;

wherein the second switch set comprises:
 a first DC node corresponding to one of the second DC inputs;
 a second DC node corresponding to one of the second DC inputs;
 a plurality of AC nodes each corresponding to one of the second AC outputs respectively;
 a plurality of switches each having a switch first end connected to the first DC node and a switch second end connected to one of the plurality of AC nodes respectively;
 a capacitor having a first end connected to the first DC node and a second end connected the second DC node;
 a plurality of diodes each connected between the switch second end of one of the plurality of switches and one of the plurality of AC nodes respectively;
 a first common node connected to each switch first end of the plurality of switches;
 a second common node connected to the first DC node and the capacitor first end; and
 a diode connected between, the first common node and the second common node.

2. The system according to claim 1, wherein a first voltage of the first voltage source is higher than or equal to a second voltage of the second voltage source.

3. The system according to claim 1, wherein the first switch set comprises a single source multi-phase inverter.

4. The system according to claim 1, wherein the controller is further configured to control duty cycles of:
 the first control inputs; and
 the second control inputs.

5. The system according to claim 1, further comprising a multi-phase load coupled to the first AC outputs and the second AC outputs.

6. The system according to claim 1, wherein the second switch set comprises a plurality of controlled switches connected in parallel between corresponding second DC inputs and second AC outputs, and configured to control current flow between the second DC inputs and the second AC outputs.

7. The system according to claim 1, wherein the second switch set further comprises a plurality of diodes configured to limit the direction of current flow.

8. A two-source inverter system, the system comprising:
 a first voltage source;
 a second voltage source;
 a first switch set having first DC inputs, first AC outputs, and first control inputs, wherein the first DC inputs are coupled to the first voltage source, and wherein the first AC outputs are configured to be coupled to an AC multi-phase load;
 a second switch set having second DC inputs, second AC outputs, and second control inputs, wherein the second DC inputs are coupled to the second voltage source, and wherein the second AC outputs are configured to be coupled to the AC multi-phase load; and
 a controller coupled to the first control inputs and the second control inputs, the controller being configured to receive first feedback signals and second feedback signals from the first switch set and the second switch set respectively, and the controller being configured to control current flow through the first switch set and the second switch set;

wherein the second switch set comprises:
 a first DC node corresponding to one of the second DC inputs;
 a second DC node corresponding to one of the second DC inputs;
 a first AC node corresponding to one of the second AC outputs;
 a second AC node corresponding to one of the second AC outputs;
 a third AC node corresponding to one of the second AC outputs;
 a first switch having a first switch first end connected to the first DC node and a first switch second end connected to the first AC node;
 a second switch having a second switch first end connected to the first DC node and a second switch second end connected to the second AC node;
 a third switch having a third switch first end connected to the first DC node and a third switch second end connected to the third AC node;
 a capacitor having a first end connected to the first DC node and a second end connected the second DC node;
 a first diode connected between the first switch second end and the first AC node;
 a second diode connected between the second switch second end and the second AC node;
 a third diode connected between the third switch second end and the third AC node;
 a first common node connected to the first switch first end, the second switch first end, and the third switch first end;
 a second common node connected to the first DC node and the capacitor first end; and
 a fourth diode connected between, the first common node and the second common node.

9. A two-source inverter system, the system comprising:
 a first DC voltage source;
 a second DC voltage source having a first pole and a second pole;
 an inverter coupled to the first DC voltage source, and coupled to a first AC output node, a second AC output node, and a third AC output node, the inverter comprising first control inputs;
 a switch set coupled to the first pole of the second DC voltage source, the switch set comprising:
  a first diode having its cathode coupled to the first AC output node;
  a second diode having its cathode coupled to the second AC output node;
  a third diode having its cathode coupled to the third AC output node;
  a common switch node;
  a first switch coupled between the common switch node and the anode of the first diode;

a second switch coupled between the common switch node and the anode of the second diode;

a third switch coupled between the common switch node and the anode of the third diode; and second control inputs for controlling switching of the first switch, the second switch, and the third switch; and a controller coupled to the first control inputs and the second control inputs, and configured to control current flow through the inverter and the switch set, resulting in a multi-phase AC output established at the first AC output node, the second AC output node, and the third AC output node.

10. The two-source inverter system of claim 9, the switch set further comprising a fourth diode having its cathode coupled to the common switch node, and having its anode coupled to the second pole of the second DC voltage source.

11. The two-source inverter system of claim 9, further comprising a capacitor coupled between the first pole of the second DC voltage source and the second pole of the second DC voltage source.

* * * * *